United States Patent
Solonen et al.

[11] Patent Number: 5,913,171
[45] Date of Patent: Jun. 15, 1999

[54] SYNCHRONIZING A MOBILE STATION TRANSMISSION

[75] Inventors: Juha Solonen, Äänekoski; Jari Koskelo, Vantaa, both of Finland

[73] Assignee: Nokia Telecommunications Oy, Espoo, Finland

[21] Appl. No.: 08/737,083
[22] PCT Filed: Mar. 1, 1996
[86] PCT No.: PCT/FI96/00125
  § 371 Date: Oct. 30, 1996
  § 102(e) Date: Oct. 30, 1996
[87] PCT Pub. No.: WO96/27955
  PCT Pub. Date: Sep. 12, 1996

[30] Foreign Application Priority Data
Mar. 3, 1995 [FI] Finland .................................... 951012

[51] Int. Cl.$^6$ .................................................. H04B 1/00
[52] U.S. Cl. .............................. 455/502; 455/71; 455/75; 455/119
[58] Field of Search ................... 455/502, 88, 86, 455/87, 75, 77, 71, 119, 63; 370/310, 343; 375/356

[56] References Cited

U.S. PATENT DOCUMENTS

| 3,798,650 | 3/1974 | McComqs et al. |
|---|---|---|
| 5,249,305 | 9/1993 | Wieczorek et al. ......................... 455/71 |
| 5,450,617 | 9/1995 | Moore ........................................ 455/71 |
| 5,537,685 | 7/1996 | Matsuno ................................... 455/502 |
| 5,666,661 | 9/1997 | Grube et al. .............................. 455/63 |

FOREIGN PATENT DOCUMENTS

| 2 285 723 | 7/1995 | United Kingdom . |
|---|---|---|
| 2 286 505 | 8/1995 | United Kingdom . |
| 2 290 677 | 1/1996 | United Kingdom . |
| 95/15623 | 6/1995 | WIPO . |
| 95/12956 | 5/1996 | WIPO . |

OTHER PUBLICATIONS

Dodrill, G.E. &. Atkinson, J.F., "Using Radio Links and Relays", 3 pages, 1953.
6085739 A (Fujitsu Ltd), Mar. 25, 1994 Abstract, Nakamura Tadashi "mobile radio communication control system".
7067182 A (Nippon Motorola Ltd), Mar. 10, 1995, Abstract Sasaki Katsuharu et al "Multi–channel access system radio telephone device".

Primary Examiner—Doris H. To
Attorney, Agent, or Firm—Pillsbury Madison & Sutro LLP

[57] ABSTRACT

A method for synchronizing transmissions of mobile stations in a mobile radio system including a first and second mobile station and a radio unit all communicating on a direct mode channel. According to the method, the radio unit transmits synchronization information messages on the direct mode channel, which messages indicate the frequency used by the radio unit, and which messages include accuracy information, indicating that the accuracy of the transmit frequency used by the radio unit exceeds the accuracy normally employed on a direct mode channel. The mobile stations receive the synchronization information messages and tune respective receivers and transmitters to the frequencies indicated by the synchronization information message.

21 Claims, 1 Drawing Sheet

SYNCHRONIZING A MOBILE STATION TRANSMISSION

FIELD OF THE INVENTION

The present invention relates to a method for synchronizing transmissions of mobile stations in a mobile radio system comprising a first and second mobile station and a radio unit communicating on a direct mode channel.

BACKGROUND OF THE INVENTION

The invention relates to the field of mobile radio systems. A subscriber in a mobile radio system, i.e. a subscriber station, for instance a mobile phone or a mobile station, may be registered in a radio network or system, whereby it communicates with the radio network via system channels comprised of control and traffic channels maintained by the base stations of the radio network.

In addition to the system channels in mobile radio systems, so-called direct mode channels can also be used in connection with a radio system, i.e. direct mode operation is applied. Subscriber stations using direct mode operation do not communicate directly with the radio network or its base stations. Direct mode channels are frequencies on which mobile phones or other means of communication are able to communicate directly with each other without the system, or via repeater stations either with the base stations of the system or with other mobile stations.

Direct mode channels are typically used in situations where, for instance, a group of portable mobile phones are communicating with each other at such a long distance from the base station that system channels cannot be used.

Another important way of using direct mode channels is to increase the capacity when the traffic in the system increases fast in some part of the service area of the system, for instance in some point-like part of the radio network.

A direct mode channel is referred to using the terms direct or simplex channel, or a simplex connection. A direct mode channel is a channel which is typically not at all used by the system. For example, it may be a channel with the same channel spacing as the channels of the system, for instance 12.5 kHz or 25 kHz. Among the mobile phones operating on a direct mode channel, the transmitting station has tuned its transmitter onto the channel and transmits speech or data information. The other mobile phones set to direct mode operation have tuned their receivers onto the same channel, whereby they are able to directly receive the transmission.

Operation on a direct mode channel may take place on the analog or digital modulation principle. A mobile phone transmitting on the channel may also transmit signalling information, such as information on rights of use and priorities or on the group operating on the channel. On the direct mode channel, an encryption may be carried out or plain speech can be transmitted.

Subscriber stations using direct mode operation communicate with other subscriber stations on a direct mode channel without being in direct contact with the base stations of the radio network. The subscriber stations using direct mode operation can also communicate with one another via repeater stations. A repeater station is a piece of equipment which re-transmits messages it has received. A repeater station may also forward traffic between the radio network and the subscriber stations.

According to the TETRA standard (TETRA=Trans-European Trunked Radio) known in the field of mobile radio systems, frequency accuracy of a base station (BS) should be within +/− 0.2 ppm. Therefore, on a frequency of 800 MHz, for example, the permitted frequency tolerance is +/− 160 Hz. Frequency accuracy indicates how accurate the actual frequency of the transmitter is in relation to the nominal frequency determined for it. Mobile stations (MS) should have such a frequency accuracy that the basic accuracy is +/− 2 ppm, which is adjusted to the signal received from the base station, which has the accuracy of +/− 0.2 ppm. Thus, an accuracy of +/− 160 Hz is required for the mobile station to be accurate. This means that the mobile station MS is not allowed to transmit unless its transmit frequency falls within the limits set. In direct mode operation, all the mobile stations may not be able to receive the base station, and therefore cannot synchronize with the frequency on which it is transmitting. Synchronizing with the frequency denotes that the transmit frequency is tuned to within +/− 0.2 ppm in comparison with the receive frequency. The transmit and receive frequencies may be on different frequency channels, but at a fixed divisor from each other. In direct mode operation, however, operation takes place on the same frequency channel. The synchronization with a frequency is carried out by calculating the phase error by means of software on the basis of the received signal and by low-pass filtering the phase error obtained, whereby frequency error will be obtained. Minimizing the frequency error corresponds to synchronization with the frequency.

Previously, the idea behind frequency synchronization in direct mode traffic was that the transmitter of the receiving, i.e. the second mobile station MS2, always synchronizes with the frequency of the transmitting, i.e. the first mobile station MS1, or that a correction is not carried out at all. If the receiving mobile station MS2 of the transmission operates as the transmitting party the next time, the frequency it is using must act as the synchronizing frequency for the first mobile station MS1 which is at that moment the receiving party. The mobile station MS is not, however, capable of synchronizing exactly with the receive frequency, which means that the frequency information it transmits differs from the frequency information it received earlier. As a result of a number of changes in signal source, the frequency may drift progressively further away from the nominal frequency and possibly off the allocated frequency channel altogether.

SUMMARY OF THE INVENTION

It is an object of the invention to maintain the mobile stations in frequency synchronization with relation to each other and to the base station transmission, and to make the mobile station stay on the frequency channels allocated to them as the mobile stations communicate on the direct mode channel.

It is an object of the invention to make it possible for the mobile stations to directly communicate with each other outside the base station range and without drifting off the frequency channel allocated to them.

It is a further object of the invention to be able to maintain the frequency synchronization required of a digital data transfer method on a direct mode channel even in case of change in signal source, i.e. the transmitting elements: mobile stations, radio units, repeater stations and base stations. If the transmission synchronization stays accurate enough, the number of bit errors remains low, resulting in that the power of the transmitters can be used more efficiently.

It is an object of the invention to solve the problems of the prior art solutions.

This new type of method for synchronizing the transmissions of mobile stations is achieved by the method of the invention, which is characterized by the following steps: the radio unit transmits synchronization information messages on a direct mode channel, which messages indicate the frequency used by the radio unit, and which comprise accuracy information, indicating that the accuracy of the transmit frequency used by the radio unit exceeds the accuracy normally employed on a direct mode channel, the mobile stations receive the synchronization information messages and tune their receivers to the frequency indicated by the synchronization information message, the first mobile station tunes, in response to the accuracy information, its transmitter to the frequency indicated by the synchronization information message, and begins to transmit on the direct mode channel.

The invention further relates to a radio unit of a mobile radio system, the radio unit comprising: a transceiver for communicating with mobile stations operating on a direct mode channel, and a control unit for controlling the operation of the radio unit.

The radio unit of the invention is further characterized by comprising a transmitting means for transmitting synchronization information messages, which indicate the frequency used by the radio unit, and which comprise accuracy information, indicating that the accuracy of the transmit frequency used by the radio unit exceeds the accuracy normally employed on a direct mode channel.

The invention further relates to a mobile station communicating on a direct mode channel, the mobile station comprising: a memory means, a transceiver and a controller for controlling the operation of the mobile station.

The mobile station of the invention is characterized in that it comprises an activating means responsive to the accuracy information contained in the synchronization information message received for tuning the transceiver of the mobile station onto the frequency indicated by the synchronization information message and for activating the mobile station to transmit.

The invention is based on the idea that a radio unit which is communicating on a direct mode channel and which has an accurate enough transmit frequency adds information to its transmission that the transmission is accurate. As a result, the mobile stations monitoring that radio unit will know that they can tune both their receivers and their transmitters onto the frequency used by the radio unit. Consequently, the respective frequencies of all the radio transmitters, i.e. mobile stations and radio units, communicating on the direct mode channel will remain/change into essentially the same frequency.

An advantage of such a method according to the invention is that the frequencies of the mobile stations MS frequencies remain exactly on the correct frequency in relation to the frequency band and the given base station frequency. This also improves the operation of the Dual Watch facility. Furthermore, the potential communication distance between mobile stations communicating on a direct mode channel increases, and the quality of the connections between the mobile stations improve.

It is easier and more economical, in comparison, to maintain the frequency of a base station than a mobile station as accurately as possible at the desired spot. If the invention is adhered to, it is not necessary to build into every mobile station MS a frequency section accurate to such an extent that it could keep the transmit frequency of the mobile station accurate enough, but the mobile stations are able to utilize the frequency information generated by the base stations and forwarded by the radio unit.

BRIEF DESCRIPTION OF THE DRAWINGS

In the following, the invention will be described in closer detail with reference to the accompanying drawings, in which.

DETAILED DESCRIPTION OF THE INVENTION

The frequency can be prevented from drifting if the transmitter is synchronized with the frequency of a radio unit $MS_{Sy}$ that has exact knowledge of the frequency of the channel. This radio unit $MS_{Sy}$ can be any mobile station having exact knowledge of the frequency of the channel. The radio unit in question may be an ordinary mobile station MS or a repeater station. The frequency accuracy is based on receiving a particular base station, and a crystal oven which generates an accurate frequency. In a group call, in which at least one mobile station (i.e. $MS_{Sy}$) has the exact knowledge of the frequency of the channel, the frequency of the rest of the mobile stations is corrected as the radio unit $MS_{Sy}$ transmits. If the radio unit $MS_{Sy}$ does not transmit at all, no synchronization takes place, either. Thus, the radio unit may transmit a synchronization signal at specific intervals when there is no other traffic present, whereby the mobile stations currently communicating on the direct mode channel synchronize with the frequency of the knowledgeable radio unit. Hence, the radio unit $MS_{Sy}$ does not have to be a communicating party in the direct mode operation, but it may also participate in the communication.

Figure 1:
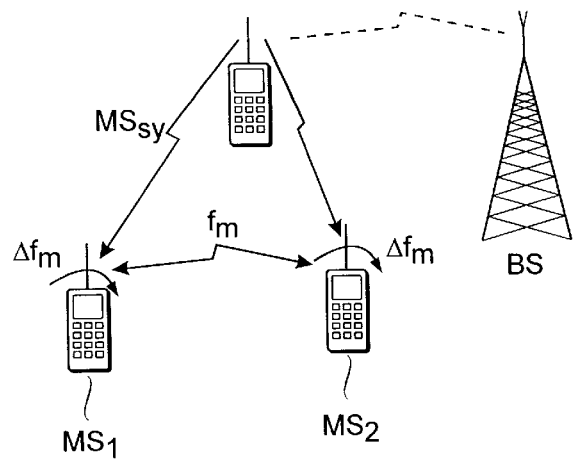
FIG. 1 is a functional diagram of mobile stations of the invention communicating on a direct mode channel.

FIG. 1 illustrates a radio unit $MS_{Sy}$ communicating on a direct mode channel, and mobile stations MS1 and MS2 that communicate with one another and with the radio unit $MS_{Sy}$. The mobile stations do not have a connection to the base station BS. Only the radio unit $MS_{Sy}$ possibly communicates with the base station. The radio unit $MS_{Sy}$ has earlier been in communication with the base station BS, or the radio unit may be in continuous communication with the base station. Thus, the radio unit is synchronized with the base station frequency. According to the invention, the radio unit informs the mobile stations of having an accurate enough frequency. When the mobile stations MS1 and MS2 communicate with each other, and the radio unit $MS_{Sy}$ is inactive, the transmission is not necessarily synchronized at all. The transmission may, however, also be synchronized on the basis of a wrong frequency information. To practice in that manner, the radio unit $MS_{Sy}$ transmits its synchronization information message at specific intervals to adjust the possibly off-tuned mobile stations MS1 and MS2 to essentially the correct frequency. In both cases, the radio unit can monitor the traffic and transmit a synchronization message when there is no other traffic present. When the radio unit $MS_{Sy}$ joins the conversation, the transmit frequencies of the mobile stations MS1 and MS2 are synchronized with the transmit frequency of the radio unit $MS_{Sy}$. As a consequence, when mobile stations MS1 and MS2 communicate, their respective transmit frequencies have been synchronized with the frequency of the base station BS. If a repeater station is employed, the mobile station can synchronize with it, if the repeater has been made accurate enough by equipping it with a crystal oven, or if the repeater has obtained an accurate frequency from the base station.

Because the frequency of radio transmitters changes in the course of time, it is sensible to give priority to different radio units $MS_{Sy}$ accordingly when the respective mobile stations MS communicate on a direct mode channel out of reach of the base station BS. Giving priority takes place either on the basis of the accuracy of the crystal, or on the basis of time that has elapsed from the reception of the base station transmission, i.e. of accurate frequency information. In such a case, the synchronization information messages may each be supplied with a respective priority so that a transceiver that has received transmission from the base station within a specific time has the highest priority. The radio unit $MS_{Sy}$ itself may also maintain a counter according to which the radio unit lowers its synchronization information priority, as the counter expires, and consequently sets the accuracy information included in the synchronization information message transmitted to indicate that the frequency accuracy of the respective radio unit has fallen.

In one of the embodiments of the invention, a bit is employed in the synchronization information message to notify of the correct frequency information. This makes it possible for the mobile station MS1 or MS2 which is listening or has been listening to the base station during, for example, the previous one minute or five minutes, and has at that time adjusted its frequency to be correct in relation to the base station frequency, to inform in the synchronization information message, by setting the bit to 1, that synchronization with the transmit frequency of the respective mobile station is feasible.

In the following, the operation of the invention will be described. At first, the mobile station $MS_{Sy}$ (radio unit) listens to the base station, and the mobile stations MS1 and MS2 do not hear the base station. The radio unit $MS_{Sy}$ begins communication on a direct mode channel by transmitting a synchronization information message, or messages, which has (have) the bit indicating the frequency information inserted.

On the basis of the transmission received from the radio unit $MS_{Sy}$, the mobile stations MS1 and MS2 adjust their respective receive frequencies to match the frequency of $MS_{Sy}$, and, in addition, store the frequency correction information received, in their respective memories. This frequency correction information is a numerical value that must be sent to the D/A converter of the transmitter in order to adjust the transmit frequency to match the receive frequency.

Following this, the radio unit $MS_{Sy}$ ceases transmitting, and the mobile station MS1 begins to transmit a synchronization message/messages. The synchronization messages may, for example, be transmitted at the beginning of each transmission. The mobile station MS1 adjusts its transmit frequency on the basis of the radio unit $MS_{Sy}$ transmission, i.e. so that the frequency matches the former MS1 receive frequency. The mobile station MS1 does not insert a frequency information bit in its transmission, because its transmission is not accurate compared to the accuracy of the base station or radio unit $MS_{Sy}$ transmission.

Following this, the mobile stations MS2 and $MS_{Sy}$ adjust their respective receive frequencies according to the transmission of the mobile station MS1 to achieve the best possible sensitivity.

When the mobile station MS1 ceases transmitting, the mobile station MS2 begins to transmit. The mobile station MS2 adjusts its transmit frequency on the basis of the radio unit $MS_{Sy}$ transmission by means of the frequency correction information stored, as explained above, and not on the basis of the mobile station MS1 transmission it just received. The mobile station MS2 does not insert a frequency information bit, because it cannot rely on the frequency to be accurate enough.

The radio unit $MS_{Sy}$ maintains, i.e. counts time from the moment on when there was information last on the radio path about frequency reference, i.e. accurate enough information on a frequency, i.e. such as the latest synchronization message with accuracy information. It must be noted that the accurate frequency information here may have been transmitted by some other radio unit $MS_{Sy}$. If the radio unit $MS_{Sy}$ does not itself take part in the conversation, it transmits for a while at an appropriate moment of time, during shift of speaking turn, in order for the mobile stations MS1 and MS2 to obtain an accurate frequency information. This method is applicable also in case the mobile stations MS1 and MS2 adjust their respective transmissions on the basis of the receive frequency not taking into account whether it is a correct reference.

If there are several mobile stations having the accurate frequency information communicating on a direct mode channel, they can all insert their respective frequency information bits in their transmissions, i.e. inform of having an accurate frequency information. This means that other mobile stations and the radio unit synchronize with the transmitting party which transmitted an accurate frequency information last.

The radio unit tunes its transmit frequency primarily on the basis of an accurate frequency information which it has obtained from a base station or its crystal oven. Consequently, the radio unit may give information in its transmission on having accurate frequency information. Otherwise, the radio unit does not give information in its transmission on having accurate frequency information.

In case direct mode operation takes place outside of the base station BS service area, a difficulty arises in that no element (mobile station, radio unit) is able to inform of having accurate frequency information, if no such mobile station MS1 that is equipped with a crystal oven is currently communicating, and which could have given the elements the accurate frequency information. The operation takes place in accordance with principles described above, but the initiating party of direct mode operation is able to employ in its first transmission accuracy information, i.e. a bit informing thereof. This enables an almost total synchronization of all the transmissions of mobile stations taking part. When any one of the mobile stations MS obtains information on the base station frequency, it transmits the frequency information to all the others.

In the following, the operation of the invention is described in a situation in which none of the mobile stations MS operating on a direct mode channel is within the base station BS service area. Consequently, the mobile stations do not obtain accurate frequency information from the base station.

As a result, operation according to the invention takes place as follows. The mobile station MS1 begins operation on a direct mode channel by transmitting a synchronization information message containing accuracy information as to the frequency, i.e., for example, the necessary one bit inserted. This means that the mobile stations $MS_{Sy}$ and MS2 adjust their respective receive frequencies to match the mobile station MS1 transmission, and store the frequency correction information obtained. Following this, as the mobile station MS1 ceases transmitting, the second mobile station MS2 commences transmitting a synchronization message. The mobile station MS2 adjusts its transmit frequency on the basis of the mobile station MS1 transmission. MS2 does not insert a frequency information bit. Following this, the mobile stations MS1 and $MS_{Sy}$ adjust their respective receive frequencies according to the transmit frequency of the mobile station MS2 in order to achieve the best possible sensitivity.

Then, the mobile station MS2 ceases transmitting, and the radio unit $MS_{Sy}$ commences transmitting. The radio unit $MS_{Sy}$ adjusts its transmit frequency on the basis of the mobile station MS1 transmission by means of the frequency correction information stored, as explained above, and not on the basis of the mobile station MS2 transmission. The radio unit $MS_{Sy}$ does not insert a frequency information bit, because it cannot rely on the frequency which it would indicate, to be accurate enough.

Next, as the radio unit $MS_{Sy}$ ceases transmitting and the mobile station MS1 commences transmitting, the mobile station MS1 does not insert a frequency information bit any more because it did not have knowledge of the accurate frequency even in the first place.

It is also possible that the mobile station MS2 can monitor the base station frequency through a Dual Watch facility. This means that it can send a synchronization message and accuracy information contained therein to inform the others of an accurate frequency. This also holds true as far as such a new mobile station MS is concerned, which joins the direct mode operation and which has knowledge of the accurate frequency.

In the following, the receiving, i.e. RX side, of radio unit and mobile station transceivers is described.

According to the method, the receiving party always adjusts its receive frequency according to synchronization by the transmitting party. A radio unit or mobile station receives a synchronization message that initiates direct mode operation, the message containing accuracy information, i.e. the necessary bit inserted. On the basis of the received accuracy information, the frequency correction information is stored by the receiving mobile station.

In the reception of the subsequent synchronization messages, the accuracy information is examined, and if the bit indicating accuracy information is inserted, the mobile station stores the frequency correction information. If, however, the bit indicating accuracy is not inserted, the previous frequency correction information remains in force.

If the mobile station monitors the base station during, for example, Dual Watch facility, the received frequency correction information is stored in the memory, and the mobile station activates a time counter. On the basis of this, it is possible in the transmission either to insert said bit or define it as zero, if the time counter has gone to zero, whereby it is known that the transmission of the mobile station is no longer accurate.

In the following, the transmitters, i.e. TX sides, of the radio unit and mobile station transceivers are described.

Upon commencing transmission, the party that initiates direct mode operation inserts an accuracy information bit into the transmission information message regardless of whether it has received transmission from the base station recently. The purpose is to synchronize all the mobile stations communicating on the direct mode channel with the same frequency. The transmit frequency is adjusted by means of the correction information obtained when the radio unit or mobile station in question last received transmission from the base station.

If the subsequent transmitter has received transmission from the base station within a specific time, it adjusts its transmit frequency according to the base station transmission and inserts a frequency information bit, indicating accuracy, into the synchronization message.

If the transmitting party has not received transmission from the base station within a specific time, the transmitting party does not insert a frequency information bit indicating accuracy in the synchronization message.

Figure 2:
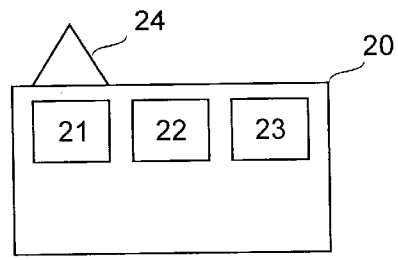
FIG. 2 is a block diagram illustration of the radio unit according to the invention.

FIG. 2 illustrates a radio unit 20 of a mobile radio system, the radio unit comprising: a transceiver 21 for communicating with mobile stations operating on a direct mode channel, a control unit 22 for controlling the operation of the radio unit. The radio unit communicates, by means of a transceiver and an antenna 24, with the mobile stations, base station and a possible repeater station communicating on the direct mode channel. The radio unit according to the invention further comprises a transmitting means 23 for transmitting synchronization information messages which indicate the frequency used by the radio unit, and which contain accuracy information indicating that the accuracy of the frequency of the transmission from the radio unit exceeds the accuracy normally employed on a direct mode channel.

In the radio unit of the invention, the transmitting means 23 is arranged to transmit the synchronization information messages at desired intervals.

In the radio unit of the invention, the transmitting means 23 is arranged to insert the accuracy information to the synchronization information messages transmitted, even if the accuracy of the transmit frequency of the radio unit does not exceed the accuracy normally employed on a direct mode channel.

Figure 3:
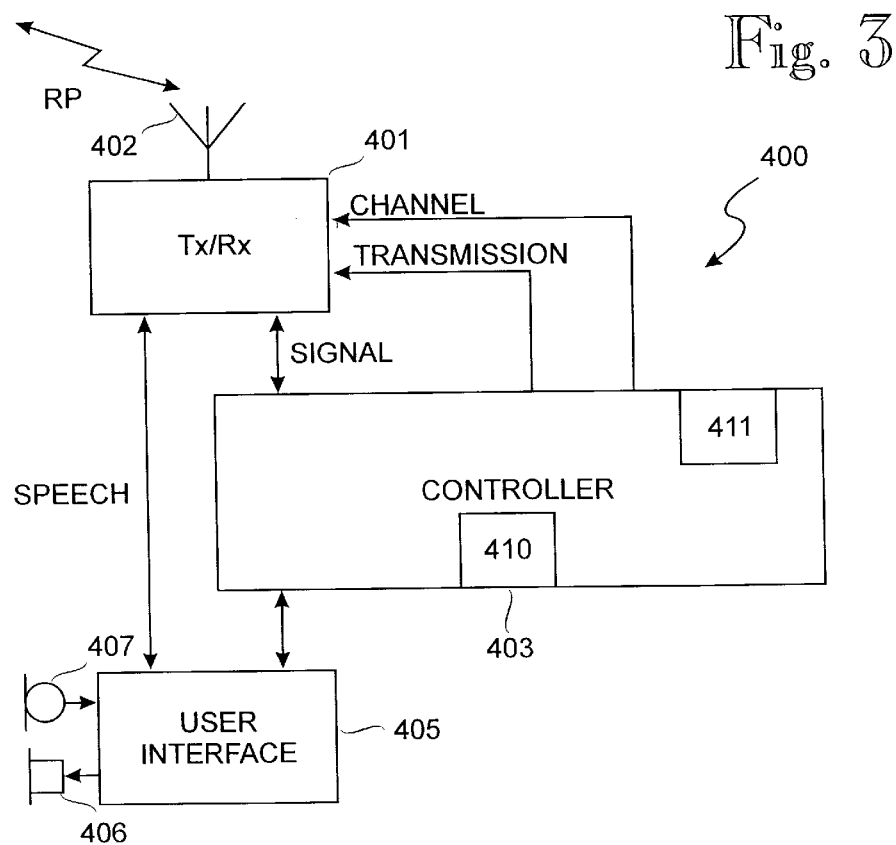
FIG. 3 is a block diagram illustration of the mobile station of the invention.

FIG. 3 is a block diagram illustration of a mobile station according to the invention. The figure shows a typical radio unit 400 communicating on a direct mode channel, such as a subscriber-operated mobile phone, a mobile station or a subscriber station. The function of the transceiver (TX/RX) 401 is to match onto the radio channel employed on any one occasion. An antenna 402 is connected to the transceiver 401, the antenna having a connection to the radio path RP. Usually, radio frequencies between the range 60–1000 MHz (VHF and UHF bands) are used, although other frequencies can also be used. An analog modulation may be applied on the radio path RP, whereby the modulation method is usually phase modulation. Other kinds of modulation methods may be applied as well. For signalling purposes, fast frequency shift keying modulation (FFSK), for example, may be used. Transmission on the radio path may also be digital.

The user interface 405 comprises an electroacoustic transducing means, typically a loudspeaker 406 and a microphone 407, and possibly buttons relating to beginning, ending and dialling a call. Because in a trunked system, and especially on a direct mode channel, conversation on the radio path RP advantageously takes place in turns, the subscriber unit typically contains a push to talk button (PTT) which must be kept pressed down for the duration of the speaking turn. The push to talk button is not shown in FIG. 3.

The purpose of a controller 403 is to control the operation of the radio unit. The controller 403 is connected to the user interface 405, from which it obtains impulses relating to, for example, the call initiation and termination. Through the user interface 405, the controller 403 may also provide the user with voice/sound or visual symbols relating to the operation of the mobile phone and/or the mobile radio system.

The controller 403 is connected to the transceiver TX/RX 401. The channel employed by the transceiver is determined by the controller 403, meaning that the transceiver 401 tunes onto a channel, i.e. radio frequency and an appropriate time slot, determined by the controller 403. The radio unit according to the invention is capable of tuning onto the frequency of the direct mode channel. The transceiver 401 is also switched on controlled by the controller 403. The controller 403 receives and transmits signalling messages by means of the transceiver 401. A radio unit, i.e. mobile station 400 according to the invention, may be used, for example, in a radio system comprising a radio network which has at least one base station and subscriber stations, and possibly one or more repeater stations forwarding traffic between subscriber stations communicating on a direct mode channel, or traffic between a base station and subscriber stations. The radio unit contains a memory means 411, a transceiver 401 and a controller 403 for controlling the operation of the mobile stations.

The mobile station of the invention comprises an activating means 410 responsive to the accuracy information contained in the synchronization information message for tuning the transceiver of the mobile station to the frequency determined by the synchronization information message, and for activating the mobile station to transmit.

In addition, the mobile station of the invention is arranged, in response to receiving a synchronization information message, to store the accuracy information contained in the synchronization information message as well as the frequency correction information into its memory means 411 in order to synchronize the transceiver of the mobile station.

Furthermore, the mobile station of the invention is arranged, in response to receiving the synchronization information message, to store the latest possible accuracy information contained in the synchronization information message as well as the frequency correction information in the memory means 411 in order to synchronize the transceiver of the mobile station.

The drawings and the description relating thereto are only intended to illustrate the idea behind the invention. In details, the method according to the invention for synchronizing mobile stations may vary within the scope of the claims. Although the invention is in the above described mainly in connection with mobile radio systems, particularly TETRA, the invention can be applied to other types of mobile radio systems.

According to one embodiment of the invention, a device that has, for example, a crystal oven to maintain the frequency accurate acts as the mobile station MS having the accurate frequency information. This means that the mobile station transmissions can be synchronized to be accurate also outside the base station coverage area.

Instead of the one bit information disclosed, i.e. the accuracy information, several bits can be used, whereby it is possible to add time information to indicate when each of the mobile stations or radio units transmitting "accurate" signals has received transmission from a base station BS producing an accurate signal. On the basis of the time information, the transmitting mobile stations can be placed in an order of quality by giving a station that has received transmission from the base station within the last 5 minutes the highest priority, and the lowest for a station that has done so within the last 30 minutes, etc. Accordingly, the receiving parties can adjust their transmit frequencies according to the transmission with the highest priority. Bits such as these can be applicable to giving priority to mobile stations having crystals of different levels of accuracy.

In the priority determination, one of the embodiments of the invention takes into account through how many intermediate stations the accurate frequency information has been obtained.

We claim:

1. A method for synchronizing transmissions of mobile stations in a mobile radio system which has a first mobile station, a second mobile station each having a respective receiver and a respective transmitter, and a radio unit all arranged for communicating on a direct mode channel, comprising:

said radio unit successively transmitting a plurality of synchronization information messages on said direct mode channel, which messages each indicated the respective frequency then used by said radio unit, and which comprise accuracy information, indicating the accuracy of the transmit frequency used by said radio unit relative to an accuracy normally employed on said direct mode channel;

said mobile stations each receiving one of said synchronization information messages, and said mobile stations tuning said receivers thereof to the frequency indicated by said synchronization information message; and said first mobile station, in response to the respective said accuracy information in said synchronization message, tuning said transmitter thereof to the frequency indicated by synchronization information message, and said first mobile station, after accomplishing said tuning, beginning to transmit on said direct mode channel.

2. The method as claimed in claim 1, wherein said accuracy information in said synchronization information message indicates that the accuracy of the transmit frequency of said radio unit does not exceed the accuracy normally employed on said direct mode channel.

3. The method as claimed in claim 1, wherein in said synchronization information message, the respective said accuracy information indicates that the accuracy of the transmit frequency used by said radio unit exceeds the accuracy normally employed on said direct mode channel.

4. The method as claimed in claim 3, wherein said radio unit includes a crystal ovens said method further comprising:

prior to transmitting said synchronization information message, said radio unit synchronizing transmission by said radio unit on the basis of synchronization information obtained from said crystal oven.

5. The method as claimed in claim 3, wherein each said accuracy information indicates how accurate is said transmit frequency of said radio unit.

6. The method as claimed in claim 3, wherein said radio unit accomplishes said transmitting of respective ones of said synchronization information messages at prescribed intervals.

7. The method as claimed in claim 3, wherein said radio unit accomplishes said transmitting of respective only of said synchronization information messages each after a specific time from the moment that said radio unit last received a respective other synchronization information message.

8. The method as claimed in claim 3, further comprising:

said mobile stations, in response to receiving each said synchronization information message, storing the respective said accuracy information contained in the respective said synchronization information messages as well as frequency correction information obtained from the respective said synchronization information message in respective memories thereof, for use by respective ones of said mobile stations in synchronizing the respective receivers and transmitters of the respective said mobile stations.

9. The method as claimed in claim 8, wherein said storing by each said mobile station includes maintaining in the respective said memory the accuracy information of the latest synchronization information message received, as well as corresponding said frequency correction information for use in synchronizing the respective receivers and transmitters of said mobile stations.

10. The method as claimed in claim 3, wherein said mobile radio system comprises at least two radio units, each of said at least two radio units transmitting a plurality of said synchronization information messages on said direct mode channel, which messages each indicated the respective frequency then used by each of said radio units, and which comprise accuracy information, and said mobile stations tuning said respective transmitters to the frequency of said radio unit transmitting the most recent transmission.

11. The method as claimed in claim 1, wherein said second mobile station receives transmissions from said first mobile station on said direct mode channel, said second mobile station tuning said transmitter thereof to match a frequency other than the frequency of said first mobile station, wherein the frequency of said second mobile station is the frequency indicated in said synchronized information message transmitted by said radio unit.

12. The method as claimed in claim 1, wherein said second mobile station receives transmissions from said first mobile station on said direct mode channel, said second mobile station tuning said transmitter thereof to match a frequency other than the frequency of said first mobile station, wherein the frequency of said second mobile station is the frequency indicated in said synchronized information message transmitted by said radio unit and said tuning of said transmitter is based on frequency correction information from said synchronization information message.

13. A method for synchronizing transmissions of mobile stations in a mobile radio system which has a first mobile station, a second mobile station, each having a respective receiver and a respective transmitter, a radio unit all arranged for communicating on a direct mode channel, and a base station, said method comprising:

said radio unit successively transmitting a plurality of synchronization information messages on said direct mode channel which messages each indicated the respective frequency then used by said radio unit, and which comprise accuracy information, indicating the accuracy of the transmit frequency used by said radio unit relative to an accuracy normally employed on said direct mode channel, said mobile stations each receiving one of said synchronization information messages, and said mobile stations tuning said receivers thereof to the frequency indicated by said synchronization information message;

said first mobile station, in response to the respective said accuracy information in said synchronization message, tuning said transmitter thereof to the frequency indicated by synchronization information message, and said first mobile station, after accomplishing said tuning, beginning to transmit on said direct mode channel; and prior to transmitting said synchronization information message said radio unit synchronizing transmission by said radio unit on the basis of synchronization information obtained from said base station, wherein in said synchronization information message, the respective said accuracy information indicates that the accuracy of the transmit frequency used by said radio unit exceeds the accuracy normally employed on said direct mode channel.

14. The method as claimed in claim 13, wherein each said accuracy information indicates how long a time has elapsed since said radio unit has most recently received synchronization information from said base station.

15. A radio unit of a mobile radio system, comprising:

a transceiver for communicating with mobile stations operating on a direct mode channel;

a control unit for controlling operation of said radio unit; and a transmitting means for transmitting synchronization information messages which indicate the frequency used by said radio unit and which comprise respective accuracy information indicating the accuracy of the transmit frequency used by said radio unit relative to an accuracy normally employed on said direct mode channel.

16. The radio unit as claimed in claim 15, wherein said transmitting means is arranged to insert respective said accuracy information in said synchronization information messages transmitted, even when the accuracy of the transmit frequency of said radio unit does not exceed said accuracy normally employed on said direct mode channel.

17. The radio unit as claimed in claim 15, wherein in each said synchronization information message, the respective said accuracy information indicates that the accuracy of the transmit frequency used by said radio unit exceeds the accuracy normally employed on said direct mode channel.

18. The radio unit as claimed in claim 17, wherein said transmitting means is arranged to transmit said synchronization information messages at prescribed intervals.

19. A mobile station arranged for communicating on a direct mode channel, comprising:

a memory means;

a transceiver including a transmitter and a receiver;

a controller for controlling the operation of the mobile station; and an activating means responsive to accuracy information contained in a synchronization information message received on a direct mode channel, from a radio unit, indicating that the accuracy of the transmit frequency used by that radio unit exceeds an accuracy normally employed by the direct mode channel for tuning the transceiver of the mobile station onto the frequency indicated by said synchronization information message and for activating the mobile station to transmit, after said tuning, on said direct mode channel.

20. The mobile station as claimed in claim 19, said mobile station further comprising:

a memory, arranged to store, in response to receiving said synchronization information message by said receiver, said accuracy information contained in said synchronization information message as well as frequency correction information for use in synchronizing said transceiver.

21. The mobile station as claimed in claim 20, wherein said memory is arranged to maintaining a version of latest said accuracy information contained in said synchronization information message as well as said frequency correction information for use in synchronizing said transceiver.

* * * * *